US008176021B2

(12) United States Patent
Kodavalla et al.

(10) Patent No.: US 8,176,021 B2
(45) Date of Patent: May 8, 2012

(54) OPTIMIZED REVERSE KEY INDEXES

(75) Inventors: Hanumantha R. Kodavalla,
Sammamish, WA (US); Pravin Mittal,
Redmond, WA (US); **Srikumar
Rangarajan**, Sammamish, WA (US)

(73) Assignee: Microsoft Corporation, Redmond, WA
(US)

( * ) Notice: Subject to any disclaimer, the term of this patent is extended or adjusted under 35 U.S.C. 154(b) by 438 days.

(21) Appl. No.: 12/131,906

(22) Filed: Jun. 2, 2008

(65) Prior Publication Data
US 2009/0300013 A1    Dec. 3, 2009

(51) Int. Cl.
*G06F 7/00* (2006.01)
*G06F 17/00* (2006.01)

(52) U.S. Cl. .................. 707/696; 707/715; 707/741
(58) Field of Classification Search .............. None
See application file for complete search history.

(56) References Cited

U.S. PATENT DOCUMENTS

| | | | |
|---|---|---|---|
| 5,748,952 A | 5/1998 | Chadha et al. | |
| 5,822,749 A | 10/1998 | Agarwal | |
| 5,842,224 A * | 11/1998 | Fenner | 711/202 |
| 5,875,445 A * | 2/1999 | Antonshenkov | 1/1 |
| 5,956,705 A | 9/1999 | Stevens et al. | |
| 6,631,366 B1 | 10/2003 | Nagavamsi et al. | |
| 6,647,386 B2 | 11/2003 | Hollines et al. | |
| 6,754,662 B1 * | 6/2004 | Li | 707/693 |
| 6,778,985 B1 | 8/2004 | Jenkins | |
| 6,785,684 B2 * | 8/2004 | Adbo | 707/693 |
| 7,774,346 B2 * | 8/2010 | Hu et al. | 707/745 |
| 7,941,451 B1 * | 5/2011 | Ritchie et al. | 707/797 |
| 2005/0165850 A1 | 7/2005 | Mosescu | |
| 2005/0216518 A1 * | 9/2005 | Hu et al. | 707/200 |
| 2007/0016582 A1 | 1/2007 | Kawamura et al. | |
| 2007/0050381 A1 * | 3/2007 | Hu et al. | 707/100 |
| 2007/0140486 A1 * | 6/2007 | Haran | 380/57 |
| 2009/0157701 A1 * | 6/2009 | Lahiri et al. | 707/100 |

OTHER PUBLICATIONS

Burleson, "Oracle Reverse Key Index Tips", 1996-2007, Burleson Enterprises, Inc., pp. 3.
Cha, et al., "P*Time: Highly Scalable OLTP DBMS for Managing Update-Intensive Stream Workload", Proceedings of the 30th VLDB(Very Large Data Bases) Conference, 2004, vol. 30, VLDB Endowment,pp. 1033-1044.
Antoshenkov, "Query Processing in DEC Rdb: Major Issues and Future Challenges", Data Engineering, Dec. 1993, vol. 16, No. 4, IEEE Computer Society, pp. 41-50.
Yas, "Oracle Blog", Sep. 4, 2006, retrieved at <<http://oracletoday.blogspot.com/2006/09/there-is-option-to create-index.html>>, Oracle Today, pp. 3.
Strohm, "Oracle Database Concepts", Release 1 (11.1), Oct. 2007, Oracle, pp. 3.
Omiecinski, "Concurrent File Reorganization: Clustering, Conversion and Maintenance", Bulletin of the IEEE Computer Society Technical Committee on Data Engineering, IEEE, 1996, pp. 24-30.

* cited by examiner

*Primary Examiner* — Jay Morrison

(57) ABSTRACT

Aspects of the subject matter described herein relate to optimized reverse key indexes. In aspects, a dispersion function disperses index values such that they are distributed across multiple pages of an index. The dispersion function utilizes a dispersion factor that indicates to what extent the index values are dispersed. Because the index values are dispersed, contention regarding inserts may be reduced or eliminated and other advantages realized.

17 Claims, 7 Drawing Sheets

OPTIMIZED REVERSE KEY INDEXES

BACKGROUND

Many online transaction processing applications have indexes on data where inserts happen in roughly sequential order. For example, order invoice numbers are typically monotonically increasing. For fast access to an invoice given the invoice number, an application may create an index on the invoice number. However, in a highly concurrent environment, inserts into the last page of an index face contention that causes scalability problems where insert operations may have to wait for other data insert operations to complete.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to optimized reverse key indexes. In aspects, a dispersion function disperses index values such that they are distributed across multiple pages of an index. The dispersion function utilizes a dispersion factor that indicates to what extent the index values are dispersed. Because the index values are dispersed, contention regarding inserts may be reduced or eliminated and other advantages realized.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise.

Exemplary Operating Environment

Figure 1:
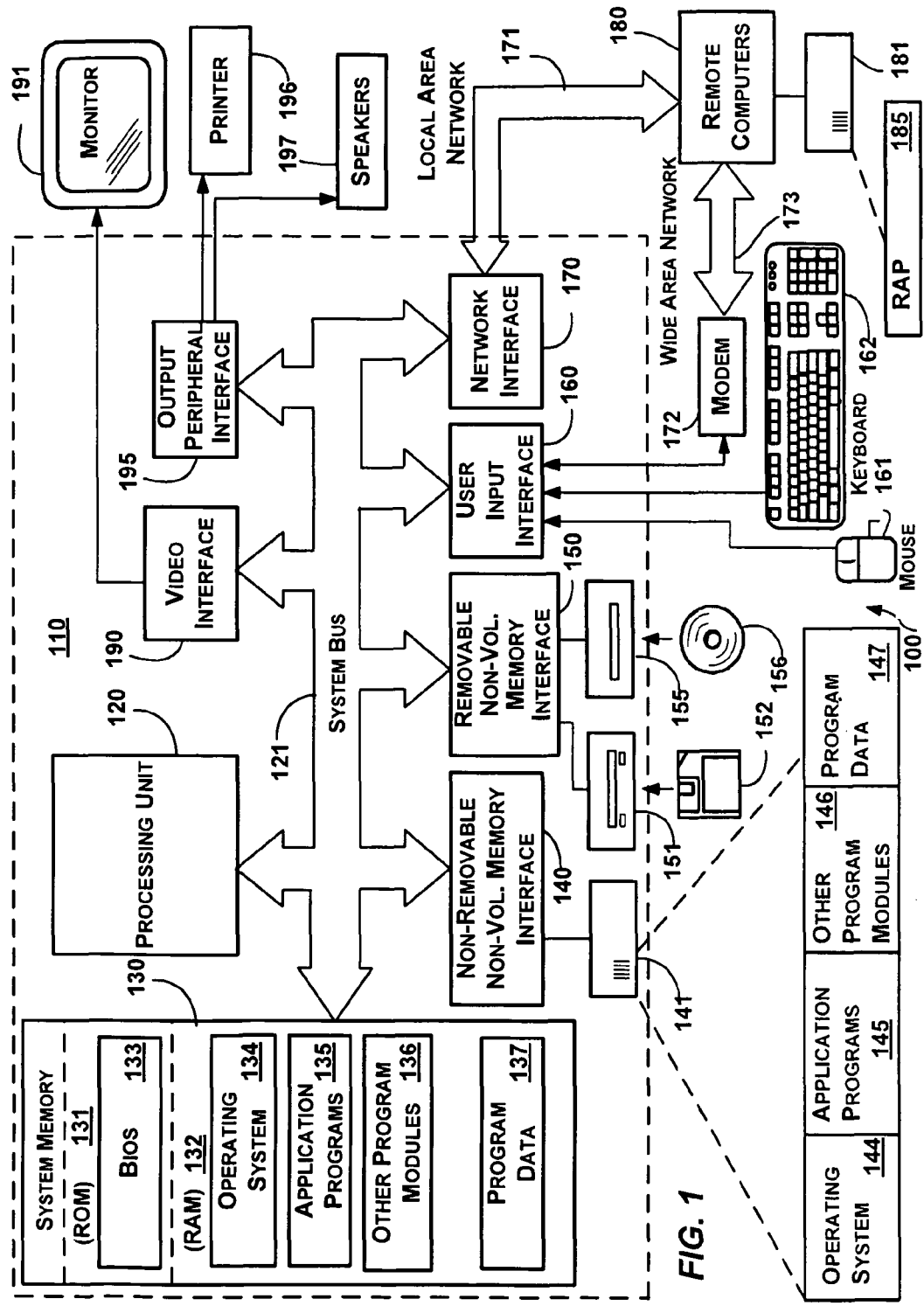
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer includes any electronic device that is capable of performing a computation. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA)

bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Indexes

Figure 2:
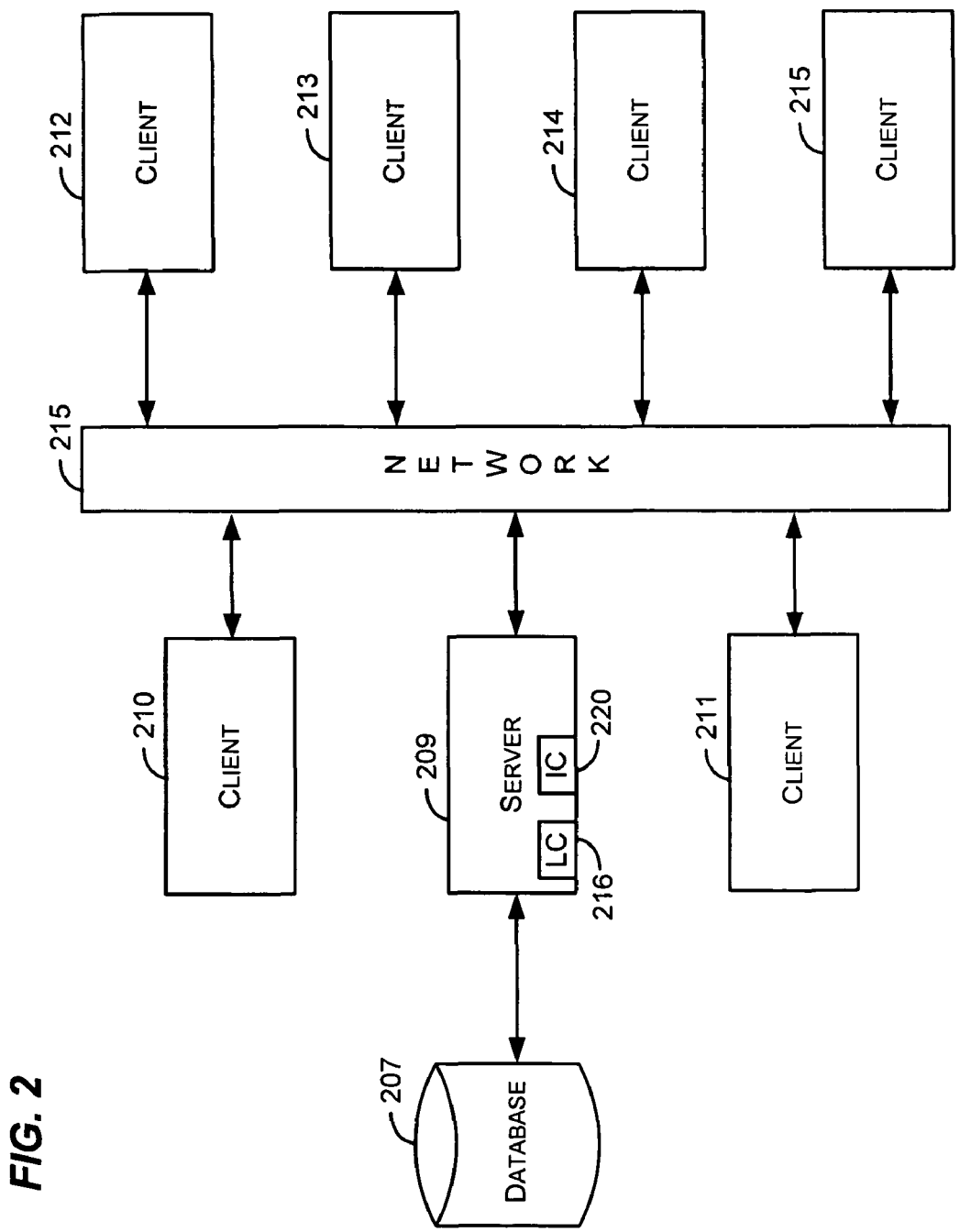
FIG. 2 is a block diagram representing an exemplary environment in which aspects of the subject matter described herein may be implemented.

As mentioned previously, creating index entries in a highly concurrent environment may cause contention that degrades performance. FIG. 2 is a block diagram representing an exemplary environment in which aspects of the subject matter described herein may be implemented. The environment may include various clients 210-215, a network 215, and may include other entities (not shown). The various entities may be located relatively close to each other or may be distributed across the world. The various entities may communicate with each other via various networks including intra- and inter-office networks and the network 215.

In an embodiment, the network 215 may comprise the Internet. In an embodiment, the network 215 may comprise one or more local area networks, wide area networks, direct connections, virtual connections, private networks, virtual private networks, some combination of the above, and the like.

The database 207 comprises a repository that is capable of storing data in a structured format. The term data is to be read broadly to include anything that may be stored on a computer storage medium. Some examples of data include information, program code, program state, program data, other data, and the like.

Data stored in the database 207 may be organized in tables, records, objects, other data structures, and the like. The data may be stored in HTML files, XML files, spreadsheets, flat files, document files, and other files. The database 207 may be classified based on a model used to structure the data. For example, the database 207 may comprise a relational database, object-oriented database, hierarchical database, network database, other type of database, some combination or extension of the above, and the like.

The database 207 may be accessed via a database management system (DBMS). A DBMS may comprise one or more programs that control organization, storage, management, and retrieval of data in the database 207. A DBMS may receive requests to access data in the database and may perform the operations needed to provide this access. Access as used herein may include reading data, writing data, deleting data, updating data, a combination including one or more of the above, and the like.

The database 207 may be stored on a data store. A data store may comprise any storage media capable of storing data. For example, a data store may comprise a file system, volatile memory such as RAM, other storage media described in conjunction with FIG. 1, other storage, some combination of the above, and the like and may be distributed across multiple devices. The data store upon which the database 207 is stored may be external, internal, or include components that are both internal and external to the server 209. Similarly, the database 207 and/or DBMS may be hosted by or separate from the server 209.

The server 209 may be implemented on or as one or more computers (e.g., the computer 110 as described in conjunction with FIG. 1). The server 209 may comprise one or more processes that provide access to data in the database 207. In one embodiment, the server 209 may host a DBMS by which the clients 210-215 may create, request, receive, and update data stored on the database 207. In another embodiment, the server 209 may host a Web server that the clients 210-215 may use to access data on the database 207. In yet another embodiment, the server 209 may host another service by which the clients 210-215 may access data on the database 207.

Each of the clients 210-215 may be implemented on or as one or more computers (e.g., the computer 110 as described in conjunction with FIG. 1). A client may comprise one or more processes that request access, either directly or indirectly, to data on the database 207. For example, a client may comprise a Web browser that accesses data from the database via a Web server that executes on the server 209. As another example, a client may comprise an application that stores data to and retrieves data from the database 207 via a DBMS that executes on the server 209.

The server 209 may host a local client 216. A local client may comprise one or more local processes that requests access to data on the database 207. Local, in this sense, refers to a process, component, or the like that executes on the same machine as the machine upon which the server 209 is implemented.

Although the terms "client" and "server" are used, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. At various times, a client and server may both be peers, servers, or clients.

The server 209 may include indexing components 220. Briefly, the indexing components 220 may disperse perform dispersion calculations on index values to access indexes in the database 207. Some exemplary indexing components are described in more detail in conjunction with FIG. 5.

Figure 3:
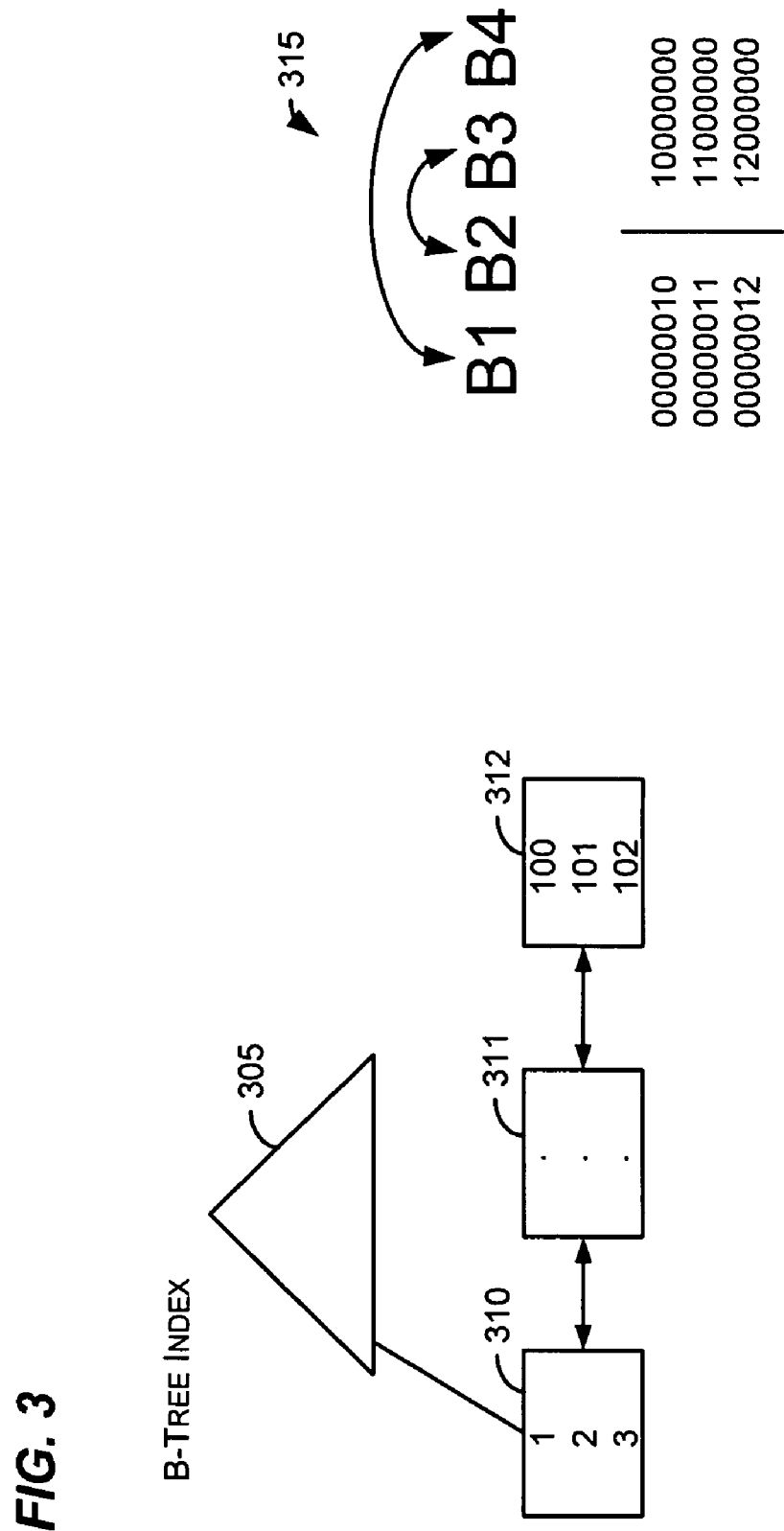
FIG. 3 is a diagram that generally represents a non-optimal reverse index scheme.

FIG. 3 is a diagram that generally represents a non-optimal reverse index scheme. To store and provide access to index entries, a B-tree 305 may be used. The B-tree 305 is a data structure that keeps index entries sorted and allowed searches, insertions, and deletions of index entries in logarithmic time. The B-Tree 305 may reference one or more pages 310-312 in which the index entries are stored. The index entries may be stored such that an index value (e.g., 1, 2, 3, . . . N) is stored together with a data value. The data value may comprise the data that is indexed by the index value or may comprise a reference that indicates where (e.g., what disk block) the data indexed by the index value may be found.

Each of the pages 310-312 may include multiple index entries. Although only three index entires are shown in each page, in practice, each page may include tens, hundreds, more, or less index entries. When multiple clients are interacting with a database in a manner to insert new monotonically increasing index values (e.g., invoice numbers), each of the inserts may be directed to a single page.

To update a page, a latch on the page may be acquired. A latch is a short term lock that gives the updator exclusive rights to the page while the latch is held. The latch may be held just long enough for an index entry to be added to the page. Unfortunately, when there is sufficient concurrency in attempts to update a given page, contention for the latch may arise that delays updates to the page. This may occur when sufficient numbers of clients are engaging in transactions that insert new index entries into a given page. With online transaction processing (OLTP) such as online Web retailers, ATMs, and other OLTP systems, where hundreds, thousands, or more users may be concurrently involved, contention may be a significant problem.

In response to this issue, database vendors have attempted to cause index entries to be inserted such that for monotonically increasing values the index entries do not generally get inserted on the same page. One approach that database vendors have used is called reverse key indexes.

In a reverse key index, all the bytes of each index value are reversed before inserting them into an index. For example, referring to 315, given an index of four bytes, with an order of B1, B2, B3, and B4, the system generates an index value having the four bytes reversed, with an order of B4, B3, B2, and B1. This causes values (represented in hexadecimal) such as 0x00000010, 0x00000011, and 0x00000012 to be represented as 0x1000000, 0x11000000, and 0x12000000, respectively. These values represent vastly different numbers than the originals.

When these values are concurrently inserted into a B-tree index, it is very likely that they will be inserted into different pages of the B-tree, thus avoiding contention.

Although this approach avoids contention, it has several problems. First adjacent keys get index values stored in "random" pages that may be anywhere in the index. Because of this random dispersion of index placement, inserting an index value for each sequential key may potentially involve a physical I/O operation which may be costly from a performance standpoint.

Second, it is common to delete keys within a data range. For example, a customer may desire to delete all invoices that are no longer relevant (e.g., invoices from last year). Due to the random distribution of index values corresponding to the keys, deleting such keys may leave fragmented pages in the index.

Third, index values for recently inserted keys are often accessed most frequently. For example, this week's invoices may be queried more often than last week's invoices. As another example, customers may be interested in tracking what they just purchased and may query the database to obtain tracking information for recent purchases. Due to the random distribution of the index values corresponding to the keys, however, each such query may result in physical I/O even though the invoice numbers are close in value.

Fourth, when these reverse keys are used, they may not be amenable for a range query. When index values for keys are stored in increasing order, querying a range of keys may involve finding the first index value for the range of keys and then simply moving forward through sequential pages until the index value for the last key in the range is found. This is very efficient from a querying perspective.

Unfortunately, when reverse keys are used, this mechanism is not available. Searching through index values corresponding to a range of keys may involve searching through an entire index table and sorting the results afterwards.

Figure 4:
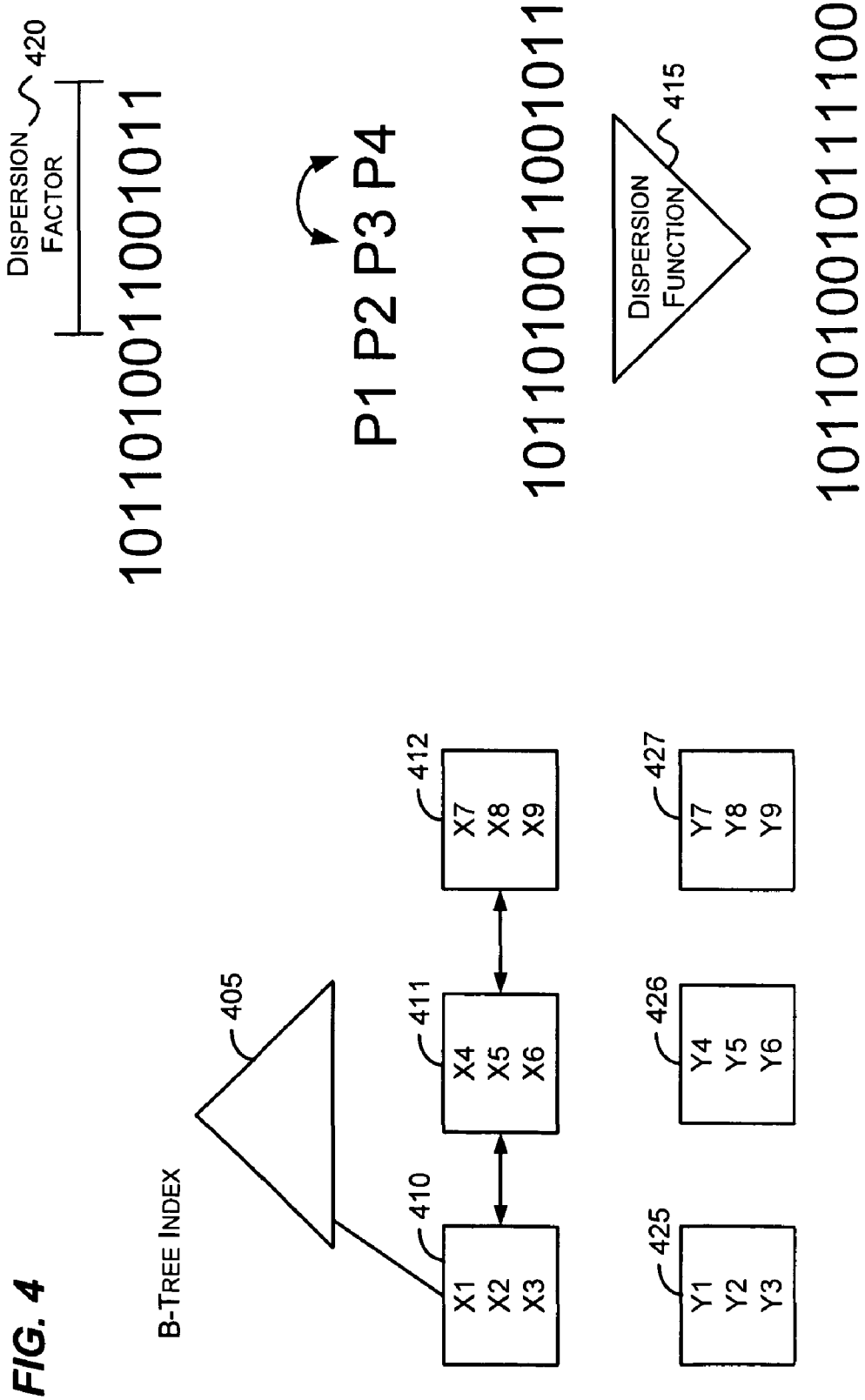
FIG. 4 is a diagram that generally represents an optimal indexing scheme in accordance with aspects of the subject matter described herein.

FIG. 4 is a diagram that generally represents an optimal indexing scheme in accordance with aspects of the subject matter described herein. To store and provide access to index entries, a B-tree 405 may be used. The B-tree 405 is a data structure that keeps index values sorted and allowed searches, insertions, and deletions of index values in logarithmic time. The B-Tree 405 may reference one or more pages 410-412 in which derived index values are stored.

Derived index values are derived via a dispersion function 415 that accounts for a dispersion factor 420. The dispersion factor 420 indicates a number of bits to swap in a first index value to create a derived index value. For example, a dispersion factor of 8 may indicate that the 4 least significant bits (e.g., portion P4) are to be swapped with the adjacent bits (e.g., portion P3) to create a derived index value.

In one embodiment, the swapping may be performed by a circular shift of the bits involved. In a circular shift, all bits involved are shifted left or right. Bits that flow out of a sequence wrap around and are used to fill in the other side. For example, in a left shift, the most significant bit becomes the least significant bit while the other bits are shifted one bit to the left. As another example, in a right shift, the least significant bit becomes the most significant bit as the other bits are shifted one bit to the right. A circular shift may specify a shift value that indicates how many positions bits are to be shifted.

In another embodiment, the swapping may be performed by copying half of the bits that are to be swapped to a variable, swapping the other half of the bits in place, and then copying the bits from the variable back into the result in the appropriate location.

The above two mechanisms for swapping bits are not meant to be all-inclusive or exhaustive. Based on the teachings herein, those skilled in the art may recognize other mechanisms for swapping bits. These other mechanisms, however accomplished, may also be used without departing from the spirit or scope of aspects of the subject matter described herein.

The first index value may correspond to an index value that is obtained (using normal index value generation methods) based on a key for a record of a database. For example, an invoice number 46283 may correspond to an index value of 1011010011001011, which is simply a translation from decimal to binary.

The first index value is passed through the dispersion function 415 to create a derived index value of 1011010010111100 which is 46268 in decimal. The dispersion function 415 in this example swaps the least significant 4 bits of the first index value (e.g., 1011) with the adjacent 4 bits (e.g., 1100) to create the derived index value. Note that using this dispersion function, an invoice number 46283 maps to a derived index value of 46268 while an invoice number of 46284 (e.g., 1011010011001100 binary) maps to a derived index value of 46284. Depending on the page size of the database, the derived index value (i.e., 46268) for invoice number 46283 may be on a different page than the derived index value (i.e., 46284) for 46284 in an index table. To increase the dispersion, the dispersion factor 420 may be increased.

The first index values illustrated in the pages 425-427 may correspond to an index value that is normally generated from a key while the derived index values illustrated in the pages 410-412 may correspond to index values that are generated from the first index values via the dispersion function 415. Thus, the derived index value X1 may correspond to the index value Y7, the derived index value X2 may correspond to the index value Y5, and so forth. In the B-tree index 405, these derived index values may be stored in a sorted order.

To retrieve data associated with a key, the dispersion function 415 may be applied to an index value corresponding to the key. The application of the dispersion function 415 yields a derived index value which may then be used in the B-tree 405 to obtain a pointer to the data associated with the key.

Based on the dispersion factor 420, the pages to which the dispersion function 415 may distribute index values may be determined. For example, given the dispersion factor 420 as illustrated, the maximum dispersion may occur when the last 8 binary digits of a first index value is 11110000, which corresponds to 240 decimal. This index value may be distributed to a derived index value of 00001111 which represents a decimal value of 15. The maximal difference in this example is 225 and in general the maximal difference that a derived index value may be dispersed from its original index value is $2^N$ when N represents the dispersion factor.

Using this knowledge, ranged queries on the dispersed index values may be satisfied by increasing the range on either side by the maximum dispersion value. While reading the index table in this manner, it is possible to find index values that are not part of the range. These index values are filtered (e.g., not used) in returning a result set in response to a query. Being able to do a range query on dispersed index values is a significant advantage compared to reverse keys that involve searching an entire index table to satisfy a range query.

Figure 5:
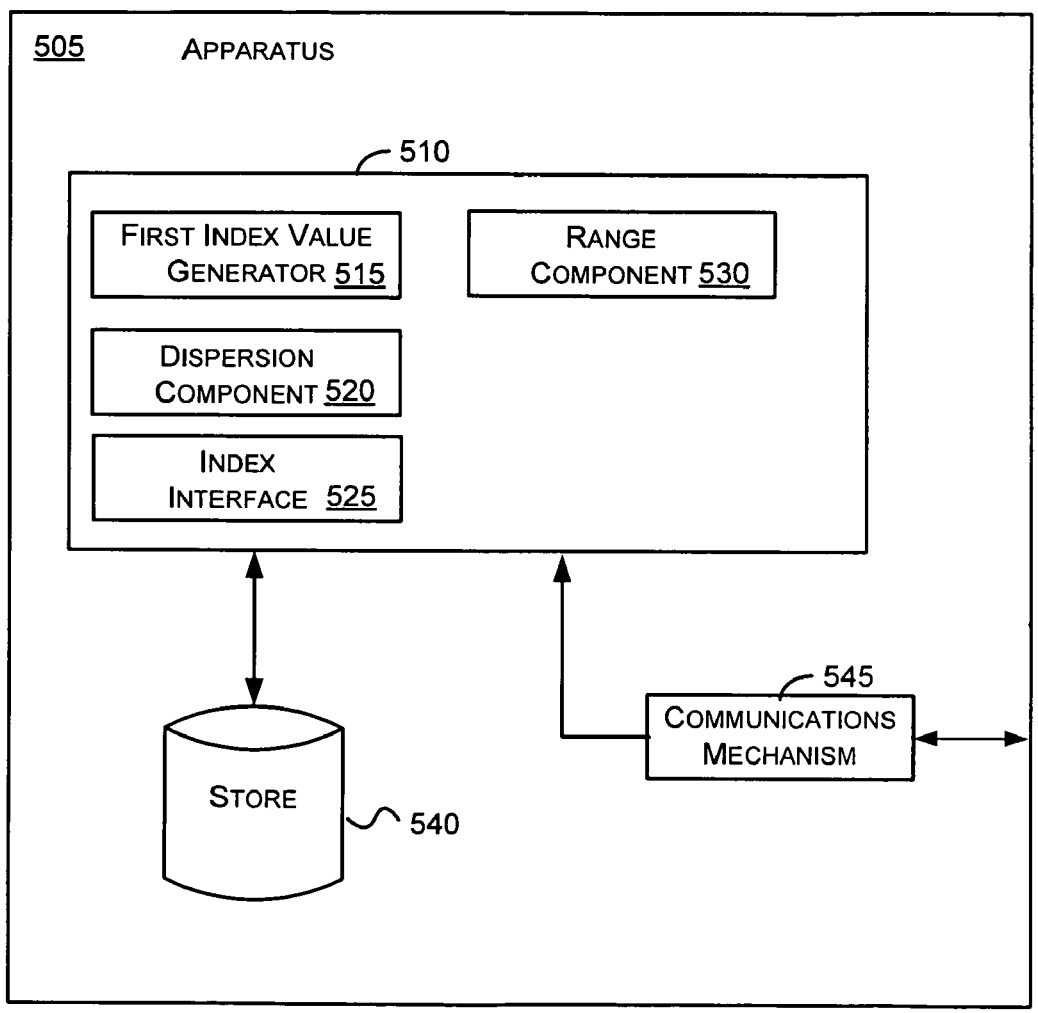
FIG. 5 is a block diagram that represents components of an exemplary system configured in accordance with aspects of the subject matter described herein.

FIG. 5 is a block diagram that represents components of an exemplary system configured in accordance with aspects of the subject matter described herein. The components illustrated in FIG. 5 are exemplary and are not meant to be all-inclusive of components that may be needed or included. In other embodiments, the components and/or functions described in conjunction with FIG. 5 may be included in other components (shown or not shown) or placed in subcomponents without departing from the spirit or scope of aspects of the subject matter described herein. In some embodiments, the components and/or functions described in conjunction with FIG. 5 may be distributed across multiple devices (e.g., two or more of the entities illustrated in FIG. 2).

Turning to FIG. 5, the apparatus 505 may include indexing components 510, a store 540, and a communications mechanism 545. The indexing components 510 may include a first index value generator 515, a dispersion component 520, an index interface 525, and a range component 530.

The communications mechanism 545 allows the apparatus 505 to communicate with other entities shown in FIG. 2. The communications mechanism 545 may be a network interface or adapter 170, modem 172, or any other mechanism for establishing communications as described in conjunction with FIG. 1.

The store 540 is any storage media capable of storing an index. An index comprises one or more index entries. Each index entry may include an index value and data or a link to where data associated with the index value is located. Index entries may be stored on pages and may be referenced by a data structure that facilities fast retrieval (e.g., the B-tree of FIG. 4). The pages may be independently lockable such that one page may be locked without locking a portion or all of another page.

The first index value generator 515 may be operable to derive a first index value from a key associated with a record of a database. Deriving may involve using the key as the first index value or creating the first index value using a function that operates on the key.

The dispersion component 520 is operable to generate a second index value from the first index value based on a dispersion factor. This may be done by swapping bits in the first index value, for example. The dispersion factor indicates a maximal potential difference between the first index value and the second index value as previously discussed. The dispersion factor may be directly related to the number of bits swapped.

The index interface 525 may access index entries in the store 540 based on index values. In accessing an index entry, the index interface 525 may insert a new index entry, delete or modify an existing index entry, or retrieve an index entry.

The range component 530 may be operable to work with range queries that involve index values that have been dispersed. In working with such queries, the range component 530 may determine a first location within an index that any of the index values in a range were potentially mapped to by the dispersion component 520. The range component 530 may also determine a last location within the index that any of the index values in the range were potentially mapped to by the dispersion component 520. The range component 530 may then access index entries between the first and last locations and filter retrieved entries that are not within the range. A retrieved entry may not be within the range, for example, if after performing an inverse dispersion calculation on the index value, the index value falls outside of the range. Where bits are swapped, an inverse dispersion calculation may be identical to a regular dispersion function.

Figure 6:
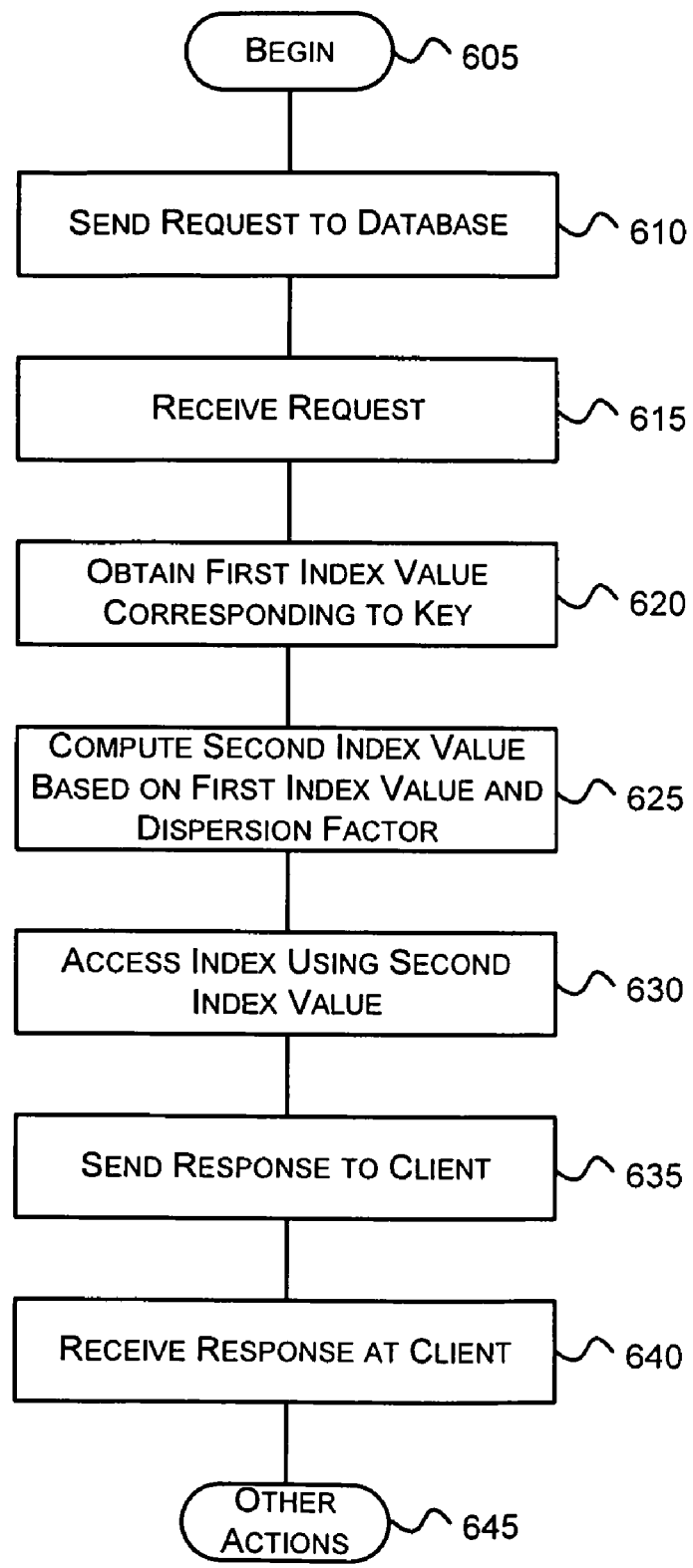
FIG. 6 is a flow diagram that generally represents exemplary actions that may occur in creating index values in accordance with aspects of the subject matter described herein.
Figure 7:
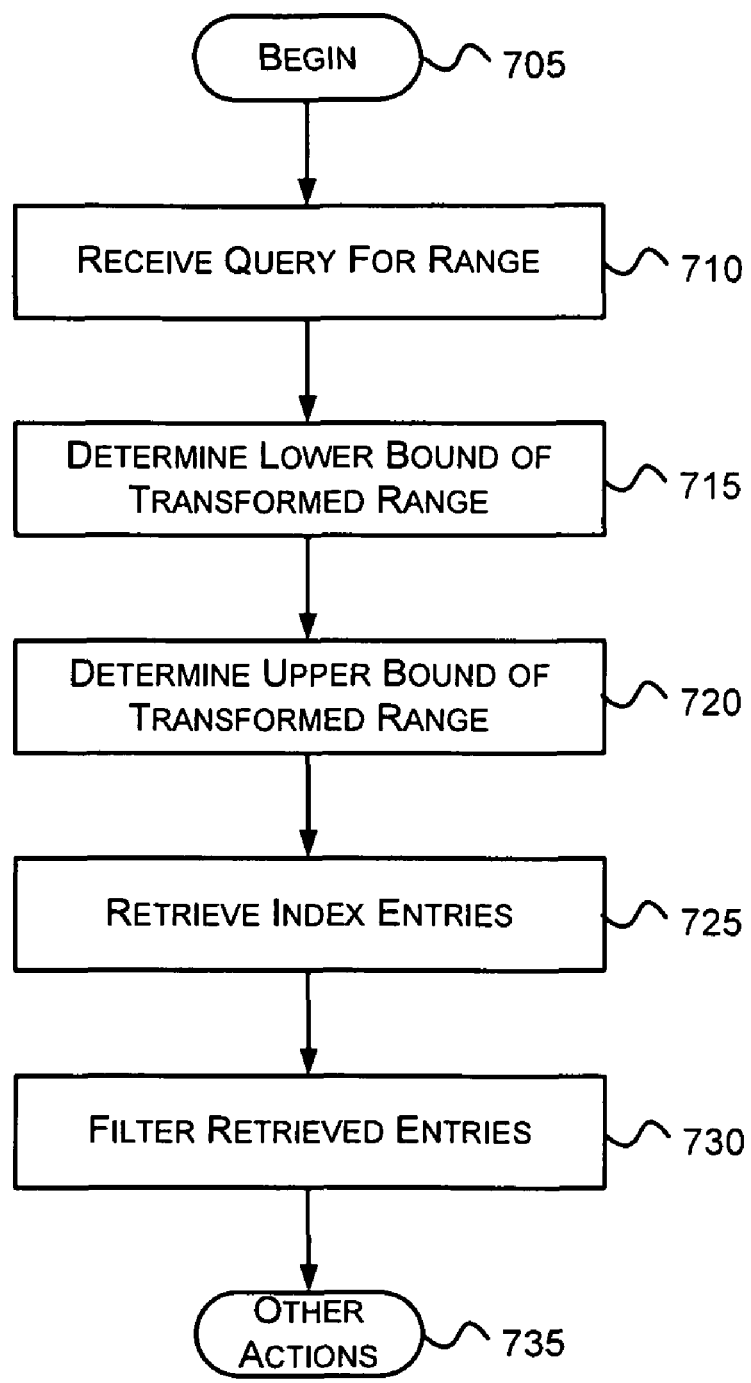
FIG. 7 is a flow diagram that generally represents exemplary actions that may occur in range activities in accordance with aspects of the subject matter described herein.

FIGS. 6-7 are flow diagrams that generally represent actions that may occur in accordance with aspects of the subject matter described herein. For simplicity of explanation, the methodology described in conjunction with FIGS. 6-7 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 6 is a flow diagram that generally represents exemplary actions that may occur in creating index values in accordance with aspects of the subject matter described herein. At block 605, the actions begin.

At block 610, a request to access data in a database is sent. For example, referring to FIG. 2, the client 210 may engage in an online transaction with the server 209. The client 210 may send a request to purchase an item displayed in a Web page generated by the server 209. In response to a request to purchase the item from the client, the server 209 may generate a new invoice to store in the database 207. The invoice may be associated with a key (e.g., an invoice number) that identifies the invoice.

At block 615, the request is received. For example, referring to FIG. 2, the server 209 may receive the request to buy an item from the client 210.

At block 620, a first index value corresponding to a key is obtained. There are cases in which the first index value is identical to the key. For example, an invoice number (e.g., the key) may be identical to the first index value. In this case, obtaining the first index value involves obtaining the key. In cases where the first index value is derived from the key, the key may be passed to a function that generates the first index value based on the key.

At block 625, a second index value is computed based on the first index value and a dispersion factor. For example, referring to FIG. 5, the dispersion component 520 may swap bits within the first index value to create the second index value.

At block 630, an index is accessed using the second index value. For example, referring to FIG. 5, the second index value may be used by the index interface 525 to access an index entry in the store 540.

At block 635, a response is sent to the client. For example, referring to FIG. 2, the server 209 may send the client 210 a key (e.g., an invoice number) that may be used to reference an item the client 210 purchased.

At block 640, the client receives the response. For example, referring to FIG. 2, the client 210 may receive the key and display it to a user of the client 210.

At block 645, other actions, if any, may occur.

FIG. 7 is a flow diagram that generally represents exemplary actions that may occur in range activities in accordance with aspects of the subject matter described herein. At block 705, the actions begin.

At block 710, a query associated with a range of indexes is received. For example, referring to FIG. 2, the local client 216 may issue a query regarding invoices between invoice number 100 and invoice number 200.

At block 715, a determination is made as to a lower bound of a transformed range corresponding to the range included in the query. As described previously, because of dispersion, index entries may be distributed to various pages within an index. Based on the dispersion factor and the range, however, the lowest index value that could potentially be involved with the range may be calculated. In one embodiment, this may involve the formula:

$$LB=RL-D,$$

where LB=the lower bound for the transformed range, RL=the lowest value of the range included in the query, and D=the maximum dispersion value.

At block 720, a determination is made as to an upper bound of a transformed range corresponding to the range included in the query. For example, the upper bound for the transformed range may be calculated by the following formula:

$$UB=RU+D,$$

where UB=the upper bound for the transformed range, RU=the highest value of the range included in the query, and D=the maximum dispersion value.

At block 725, the index entries between (and inclusive of) the first and last index values calculated above are retrieved. For example, referring to FIG. 5, the range component 530 may utilize the index interface 525 to retrieve index entries between the lower and upper index values determined above.

At block 730, entries that do not map to the range of index values are filtered. For example, for each index entry that does not fall within the range, the index entry is removed from the result set.

At block 735, other actions, if any, may occur.

As can be seen from the foregoing detailed description, aspects have been described related to optimized reverse key indexes. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   receiving a request to access data in a database, the data associated with a key that identifies the data;
   obtaining a first index value, the first index value corresponding to the key;
   computing a second index value based on the first index value and a dispersion factor, the dispersion factor indicative of a maximal potential difference between the first index value and the second index value, the second index value having a same first portion as a first portion of the first index value, and computing the second index value by performing a circular bit shift on a last portion of the first index value, the last portion corresponding to the dispersion factor; and
   accessing an index associated with the data using the second index value, the index comprising pages that are independently lockable, each page of the index including a corresponding set of index entries, each index entry including a corresponding index value, receiving a query for a first range of index values;
   determining a lower bound of a transformed range corresponding to the first range;
   determining an upper bound of the transformed range;
   retrieving index entries between the lower and upper bounds; and
   filtering retrieved index entries that do not map to the first range of index values.

2. The method of claim 1, wherein the dispersion factor indicates a number of bits to shift in the first index value to create the second index value.

3. The method of claim 1, wherein the adjacent-valued indexes are monotonically increasing.

4. The method of claim 1, wherein accessing an index associated with the data using the second index value comprises storing the second index value in a B-tree.

5. The method of claim 1, wherein accessing an index associated with the data using the second index value comprises storing the second index value in a sorted order with respect to other index values in a data structure that facilitates fast retrieval.

6. The method of claim 1, wherein the lower bound is less than or equal to a lowest index value in the index that any of the index values in the first range is potentially mapped to when transformed based on the dispersion factor; and
   the upper bound being greater than or equal to a highest index value in the index that any of the index values in the range is potentially mapped to when transformed based on the dispersion factor.

7. In a computing environment, an apparatus comprising:
   a computer;
   a store operable to store an index to data in a database in a data structure that facilities fast retrieval, the data structure comprising a plurality of pages, each page being independently lockable from each other page, each page of the data structure including a corresponding set of index entries, each index entry including a corresponding index value;
   an index generator operable to derive a first index value from a key associated with a record of the database;
   a dispersion component operable to generate a second index value from the first index value based on a dispersion factor using the computer, the second index value having a same first portion as a first portion of the first index value, the dispersion factor indicative of a maximal potential difference between the first index value and the second index value, the dispersion component is operable to generate a second index value from the first index value based on a dispersion factor by performing a circular bit shift on a last portion of the first index value;
   an index interface operable to use the second index value to access the index; and
   a range component that for a received a query for a first range of index values determines a lower bound of a transformed range corresponding to the first range, determines an upper bound of the transformed range, retrieves index entries between the lower and upper bounds, and filters retrieved index entries that do not map to the first range of index values.

8. The apparatus of claim 7, wherein the dispersion factor indicates a number of bits to be circularly shifted.

9. The apparatus of claim 7, wherein the lower bound is less than or equal to a lowest index value in the index that any of the index values in the first range is potentially mapped to when transformed based on the dispersion factor; and
   the upper bound being greater than or equal to a highest index value in the index that any of the index values in the range is potentially mapped to when transformed based on the dispersion factor.

10. The method of claim 1, further comprising specifying a shift value that indicates a number of positions bits are shifted in the circular bit shift.

11. The apparatus of claim 7, wherein the dispersion component is operable to generate a second index value from the first index value based on a dispersion factor by performing the circular bit shift on the last portion of the first index value by circularly shifting the bits a number of positions indicated by a shift value.

12. A computer storage medium having computer-executable instructions, the computer-executable instructions comprising:
   first computer-executable instructions that enable a computer to obtain a first index corresponding to a key that identifies data in a database, the data requested to be accessed in a received request;
   second computer-executable instructions that enable a computer to compute a second index value based on the first index value and a dispersion factor, the dispersion factor indicative of a maximal potential difference between the first index value and the second index value, the second index value having a same first portion as a first portion of the first index value, and the second index value computed by performing a circular bit shift on a last portion of the first index value, the last portion corresponding to the dispersion factor; and
   third computer-executable instructions that enable a computer to access an index associated with the data using the second index value, the index comprising pages that are independently lockable, each page of the index including a corresponding set of index entries, each index entry including a corresponding index value;
   fourth computer-executable instructions that enable a computer to determine a lower bound of a transformed range corresponding to a first range of index values, the first range of index values received in a query;
   fifth computer-executable instructions that enable a computer to determine an upper bound of the transformed range;
   sixth computer-executable instructions that enable a computer to retrieve index entries between the lower and upper bounds; and
   seventh computer-executable instructions that enable a computer to filter retrieved index entries that do not map to the first range of index values.

13. The computer storage medium of claim 12, wherein the dispersion factor indicates a number of bits to shift in the first index value to create the second index value.

14. The computer storage medium of claim 12, wherein the adjacent-valued indexes are monotonically increasing.

15. The computer storage medium of claim 12, wherein the third computer-executable instructions comprise computer-executable instructions that enable a computer to store the second index value in a B-tree.

16. The computer storage medium of claim 12, wherein the third computer-executable instructions comprise computer-executable instructions that enable a computer to store the second index value in a sorted order with respect to other index values in a data structure that facilitates fast retrieval.

17. The computer storage medium of claim 12, wherein the last portion of the second index value includes the bits of the last portion of the first index value circularly shifted by a number of positions indicated by a shift value.

* * * * *